(12) United States Patent
Karaoguz et al.

(10) Patent No.: US 8,992,631 B2
(45) Date of Patent: *Mar. 31, 2015

(54) THEFT PREVENTION OF MEDIA PERIPHERALS IN A MEDIA EXCHANGE NETWORK

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/732,021

(22) Filed: Dec. 31, 2012

(65) Prior Publication Data

US 2013/0125229 A1 May 16, 2013

Related U.S. Application Data

(63) Continuation of application No. 10/672,907, filed on Sep. 26, 2003, now Pat. No. 8,343,235.

(60) Provisional application No. 60/467,098, filed on Apr. 30, 2003, provisional application No. 60/461,717, filed on Apr. 10, 2003, provisional application No. 60/443,894, filed on Jan. 30, 2003, provisional application No. 60/432,472, filed on Dec. 11, 2002.

(51) Int. Cl.
| | |
|---|---|
| *H04L 29/06* | (2006.01) |
| *H04L 9/32* | (2006.01) |
| *H04W 4/00* | (2009.01) |
| *H04W 4/02* | (2009.01) |
| *G06F 21/88* | (2013.01) |
| *H04W 12/12* | (2009.01) |

(52) U.S. Cl.
CPC .......... *H04L 63/08* (2013.01); *H04L 63/0823* (2013.01); *H04W 4/001* (2013.01); *H04W 4/02* (2013.01); *G06F 21/88* (2013.01); *G06F 2221/2111* (2013.01); *H04W 12/12* (2013.01)
USPC ........ 726/35; 726/4; 726/7; 726/10; 713/175; 705/56

(58) Field of Classification Search
None
See application file for complete search history.

(56) References Cited

U.S. PATENT DOCUMENTS

| | | | | |
|---|---|---|---|---|
| 5,748,084 | A * | 5/1998 | Isikoff | 340/568.1 |
| 5,953,652 | A * | 9/1999 | Amin et al. | 455/410 |
| 6,643,781 | B1* | 11/2003 | Merriam | 726/35 |
| 7,133,920 | B2* | 11/2006 | Tsujisawa | 709/229 |
| 7,317,798 | B2* | 1/2008 | Saito | 380/277 |
| 7,370,112 | B2* | 5/2008 | Saito et al. | 709/229 |
| 8,343,235 | B2* | 1/2013 | Karaoguz et al. | 726/35 |
| 2002/0165953 | A1* | 11/2002 | Diong | 709/224 |
| 2002/0177472 | A1* | 11/2002 | Tomoda et al. | 455/569 |
| 2006/0059100 | A1* | 3/2006 | Ronning et al. | 705/59 |

* cited by examiner

*Primary Examiner* — Christopher Revak

(74) *Attorney, Agent, or Firm* — Garlick & Markison; Bruce E. Garlick

(57) ABSTRACT

Systems and methods of theft prevention of communication devices are provided. In one embodiment, the method may include, for example, one or more of the following: registering a communication device being used at a home, where the device is connected to a communication network; entering validation information relating to the communication device; and analyzing the validation information to determine whether the communication device is authorized for use in the communication network.

20 Claims, 13 Drawing Sheets

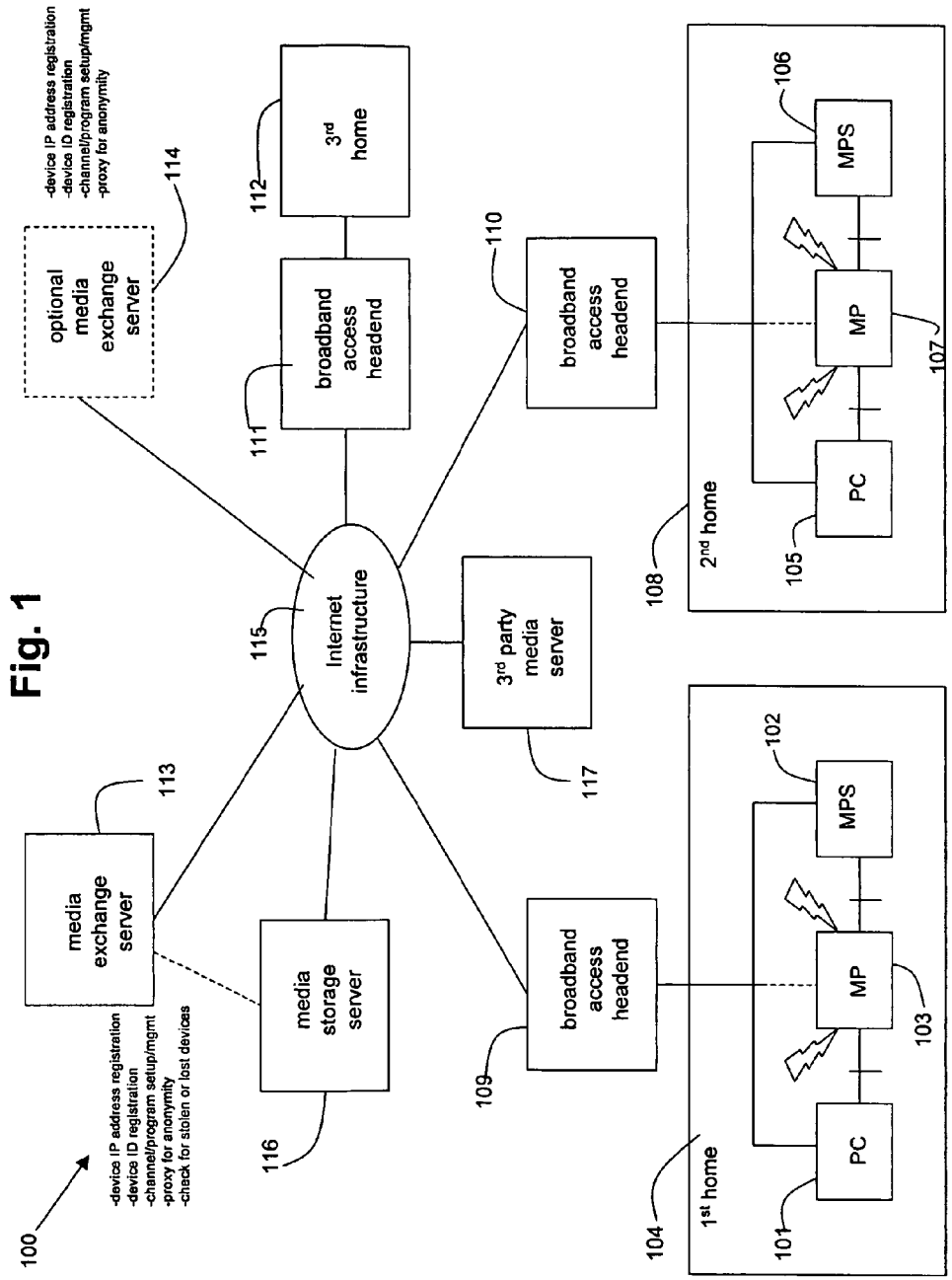

| CHANNEL LINE UP | HOUR, DAY | | | | |
|---|---|---|---|---|---|
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

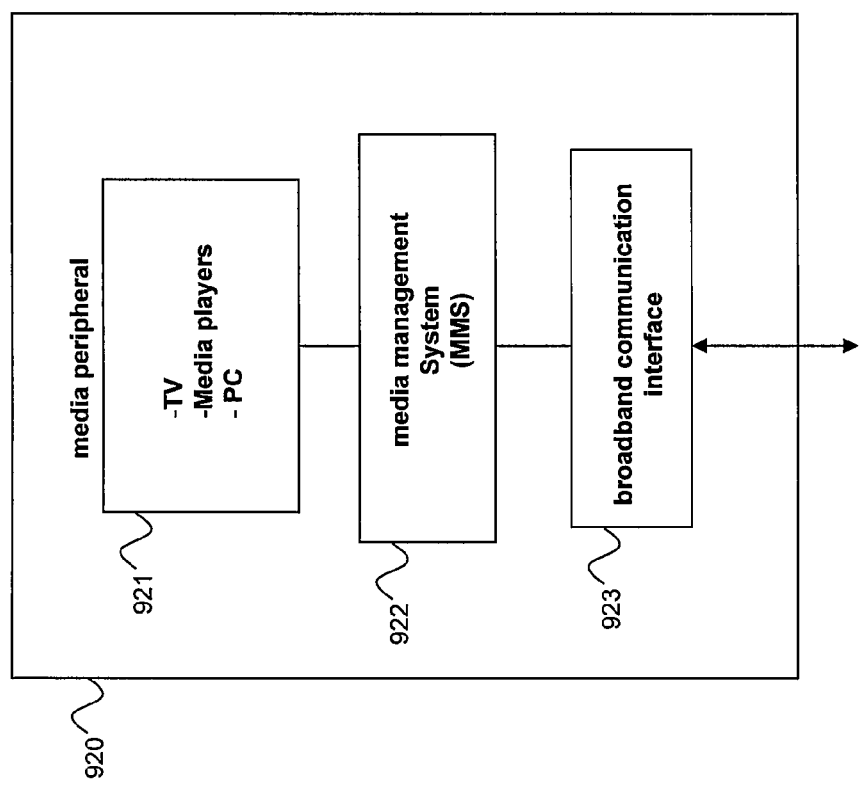

THEFT PREVENTION OF MEDIA PERIPHERALS IN A MEDIA EXCHANGE NETWORK

CROSS-REFERENCE TO RELATED APPLICATIONS/INCORPORATION BY REFERENCE

The present U.S. Utility patent application claims priority under 35 U.S.C. §120, as a continuation of U.S. Utility patent application Ser. No. 10/672,907, filed on Sep. 26, 2003, issuing as U.S. Pat. No. 8,343,235, which is incorporated herein by reference in its entirety for all purposes. The Ser. No. 10/672,907 application claims priority under 35 U.S.C. §119 (e) to U.S. Provisional Patent Applications No. 60/467,098, filed on Apr. 30, 2003; No. 60/461,717, filed on Apr. 10, 2003; No. 60/432,472, filed on Dec. 11, 2002; and No. 60/443,894, filed on Jan. 30, 2003. The complete subject matter of all four Provisional Applications are hereby incorporated herein by reference, in their entirety.

In addition, Applicants hereby incorporate herein by reference, in their entirety, the complete subject matter of U.S. Provisional Patent Application No. 60/457,179, entitled "Server Architecture Supporting A Personal Media Exchange Network", filed on Mar. 25, 2003; U.S. Utility patent application Ser. No. 10/657,390, entitled "Personal Inter-Home Media Exchange Network", filed on Sep. 8, 2003; and U.S. Utility patent application Ser. No. 10/660,267, entitled "Personal Access And Control Of Media Peripherals On A Media Exchange Network", filed on Sep. 11, 2003.

BACKGROUND OF THE INVENTION

Today, digital media devices such as, for example, digital camcorders, digital cameras, and MP3 players are standalone devices that may be connected to a PC (personal computer) through a USB (universal serial bus) interface to download digital files without any form of user authentication or authorization.

When a user roams with a digital media device and is not near a PC, the user is limited by the memory capacity of the digital media device and any additional memory for the device (such as memory sticks or tapes) that the user may have with him.

Digital files within a digital media device may be downloaded to a PC, encrypted by the PC, attached to an email message, and sent to another PC via the Internet. Also, the digital files may be sent over a network using, for example, FTP (file transfer protocol). However, neither the Internet nor the network has any knowledge of the original source of the digital files (i.e., the digital media device).

If a digital media device is stolen, it may still be used by the thief as if he were the owner.

Further limitations and disadvantages of conventional and traditional approaches will become apparent to one of skill in the art, through comparison of such systems with the present invention as set forth in the remainder of the present application with reference to the drawings.

BRIEF DESCRIPTION OF SEVERAL VIEWS OF THE DRAWINGS

FIG. 1 is a diagram illustrating an embodiment of a media exchange network comprising an architecture to support theft prevention of a media peripheral, in accordance with various aspects of the present invention.

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Figure 2A:
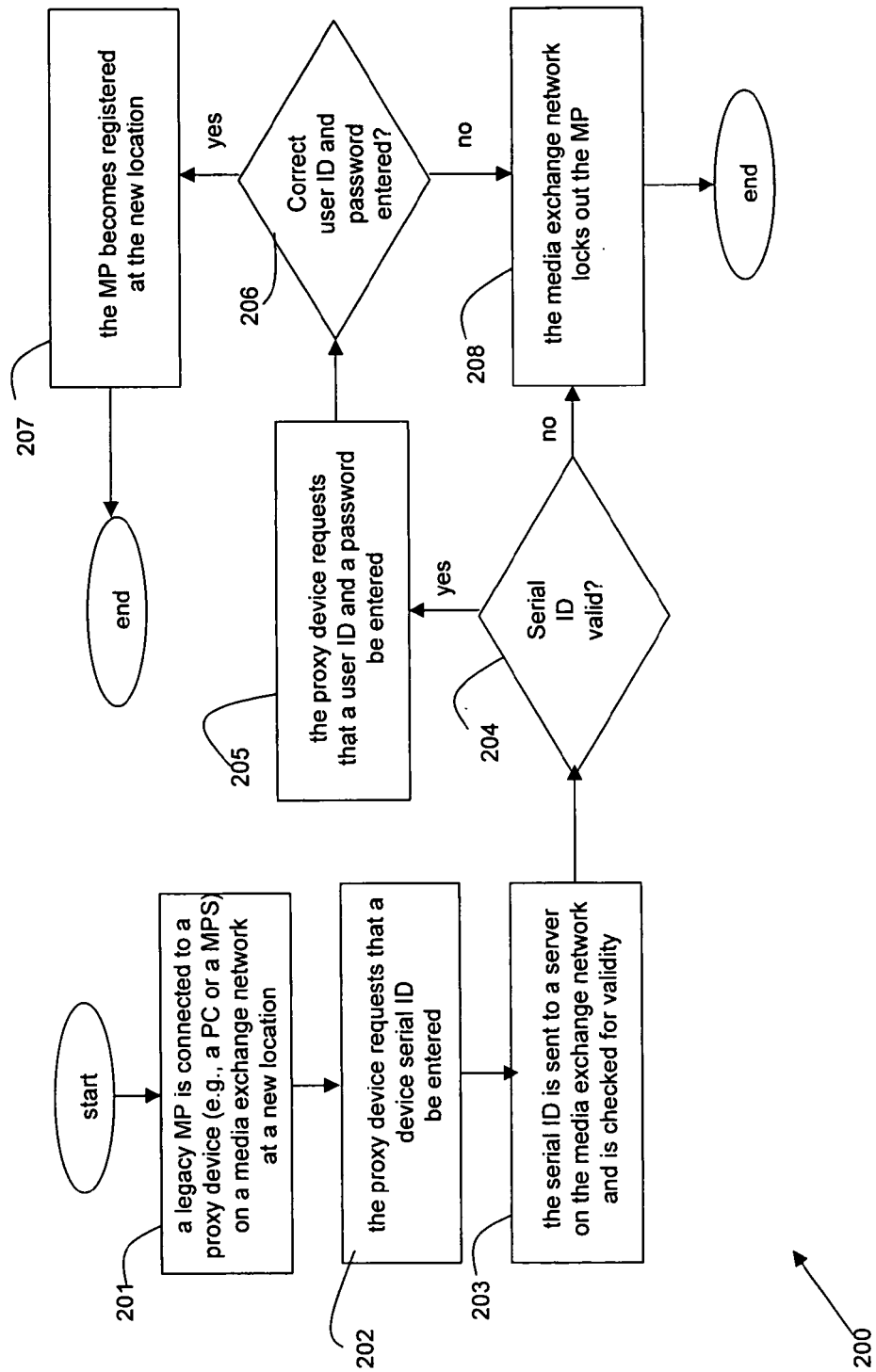
FIG. 2A is a flowchart illustrating an embodiment of a method to prevent theft of a legacy media peripheral on the media exchange network of FIG. 1, for example, in accordance with various aspects of the present invention.

Aspects of the present invention may be found in, for example, systems and methods of theft prevention of communication devices. In one embodiment, the present invention may provide for a method of theft prevention of communication devices. The method may include, for example, one or more of the following: registering a communication device being used at a location, where the device is connected to a communication network; entering validation information relating to the communication device; and analyzing the validation information to determine whether the communication device is authorized for use in the communication network.

In another embodiment, the present invention may provide a system supporting theft prevention of communication devices used in a communication network. The system may include, for example, a processor, communicatively coupled to the communication network, that receives information related to a communication device, the processor further receives validation information entered into the communication network and analyzes the validation information to determine whether the communication device is authorized for use in the communication network.

In another embodiment, the present invention may provide a system supporting theft prevention of communication devices used in a communication network. The system may include, for example, a communication device being used at a location; and a communication network communicatively coupled to the location, so that the communication network receives authorization information relating to the communication device and determines whether to grant the communication device access to the communication network.

In another embodiment, the present invention may provide a system supporting theft prevention of communication devices used in a communication network. The system may include, for example, a storage device being used at one location; a media device being used at a second location; and a communication network communicatively coupled to the first location and the second location, where the communication network analyzes authorization information and determines whether to grant access of the media device to the first location.

These and other advantages, aspects and novel features of the present invention, as well as details of an illustrated embodiment thereof, will be more fully understood from the following description and drawings.

FIG. 1 is a diagram illustrating an embodiment of a media exchange network 100 comprising an architecture to support theft prevention of a media peripheral, in accordance with various aspects of the present invention. Specifically, the media exchange network 100 is a communication network comprising a PC 101, a MPS (media processing system) 102, and at least one MP (media peripheral) 103 at a $1^{st}$ home 104; a PC 105, a MPS 106, and at least one MP 107 at a $2^{nd}$ home 108. The MP 103 interfaces to the PC 101 and/or the MPS 102 via, for example, a wireless link or a wired link (e.g., a USB connection). The PC 101 and the MPS 102 interface to a broadband access headend 109. The broadband access headend 109 may comprise a cable headend, a satellite headend, or a DSL headend, in accordance with various embodiments of the present invention. As an option, the MP 103 may interface with the broadband access headend 109. The PC 101, MPS 102, and/or MP 103 may include internal modems (e.g., a cable modem or DSL modem) or other interface devices in order to communicate with the broadband access headend 109. Optionally, the interface device (e.g., modem) may be external to the PC 101, MPS 102, and MP 103.

Similarly, the MP 107 interfaces to the PC 105 and/or the MPS 106 via, for example, a wireless link or a wired link (e.g., a USB connection). The PC 105 and the MPS 106 interface to a broadband access headend 110. The broadband access headend 110 may comprise a cable headend, a satellite headend, or a DSL headend, in accordance with various embodiments of the present invention. As an option, the MP 107 may interface with the broadband access headend 110. The PC 105, MPS 106, and/or MP 107 may include internal modems (e.g., a cable modem or DSL modem) or other interface device in order to communicate with the broadband access headend 110. Optionally, the interface device (e.g., modem) may be external to the PC 105, MPS 106, and MP 107.

The media exchange network 100 further comprises a broadband access headend 111 connected between a $3^{rd}$ home 112 and an Internet infrastructure 115, a media exchange server 113 (as in the case of a single central server supporting the media exchange network 100) and, optionally, at least one other media exchange server 114 (as in the case of a multiple server architecture) supporting the media exchange network 100 connected to the Internet infrastructure 115. That is, an embodiment of the present invention may comprise more than two media exchange servers strategically located at various points in the media exchange network 100.

The broadband access headends 109 and 110 also interface to the Internet infrastructure 115. The broadband access headend 111 may comprise a cable headend, a satellite headend, or a DSL headend, in accordance with various embodiments of the present invention. The $3^{rd}$ home 112 may also include a PC, a MPS, and/or a MP as part of the media exchange network 100.

The media exchange network 100 also comprises a media storage server 116 and a $3^{rd}$ party media server 117, both interfacing to the Internet infrastructure 115. The media storage server 116 interacts with the media exchange server 113 and provides temporary and/or archival storage for digital media on the media exchange network 100. For example, the media storage server 116 may temporarily hold media files that are addressed to certain MPS's and/or PC's on the media exchange network 100.

The $3^{rd}$ party media server 117 may store movies, video, user profiles, and other digital media that may be provided to users of the media exchange network 100.

In accordance with an alternative embodiment of the present invention, a broadband access headend may be upgraded to a media exchange headend by adding functionality to facilitate the exchange of media on the media exchange network in conjunction with the media exchange server. Such functionality may include distributed networking capability, archival functionality (long term media storage), temporary storage (to aid in the distribution and routing of media), storage management, and digital rights management.

The media exchange server architecture solves the problem of communication between a device (MPS, PC, MP) at one home and another device (MPS, PC, MP) at another home over the media exchange network 100. The media exchange servers 113 and 114 provide functionality on the media exchange network 100 including device registration, channel/program setup and management, and security.

The various elements of the media exchange network 100 include storage locations for digital media and data. The storage locations may comprise, for example, hard disk drives, a DVD player, a CD player, floppy disk drives, RAM, or any combination of these. The storage locations may also include, for example, memory sticks, PCMCIA cards, compact flash cards, or any combination of these.

The PC's (101 and 105) may comprise desktop PC's, notebook PC's, PDA's, or any computing device.

The MPS's (102 and 106) are, in one embodiment, essentially enhanced set-top-boxes. The MPS's (102 and 106) may each include a TV screen for viewing and interacting with various user interfaces, media, data, and services that are available on the media exchange network using, for example, a remote control. The PC's 101 and 105 may each include a PC monitor for viewing and interacting with various user interfaces, media, data, and services that are available on the media exchange network using, for example, a keyboard and mouse. The MPS's, PC's, and/or MP's include functional software to support interaction with the media exchange servers and media peripherals on the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The media peripherals (103 and 107) of the media exchange network 100 may include, for example, a digital camera, a digital camcorder, a MP3 player, a home juke-box system, a PDA (personal digital assistant), a multi-media gateway device, and various home appliances. The media peripherals (103 and 107) of the media exchange network 100 may comprise legacy media peripherals (those media peripherals in existence today) and/or new (non-legacy) media peripherals which may not be on the market yet. A legacy media peripheral does not have the software or interface to interact directly with a media processing system on a media exchange network. A legacy media peripheral may use a PC or a set-top-box as a proxy to interact with a media exchange network. A new media peripheral may connect to a media exchange network, interact directly with a media processing system on the media exchange network, and may include digital certificates.

In an embodiment of the present invention, a digital certificate is embedded in the firmware or hardware of a new (i.e., non-legacy) MP. The digital certificate comprises certain information including a device ID, a public key for encryption, and possibly other information related to services, payment terms, billing, and media push/access restrictions and limitations. The digital certificate may be installed in the MP by the manufacturer or seller at the time of purchase. Alternatively, the digital certificate may be downloaded by the manufacturer to the MP, over a media exchange network, via a PC or a MPS when a user first connects the MP to a PC or a MPS.

As defined herein, a legacy MP does not include a digital certificate or any other type of identifying firmware, software, or electronic hardware for interacting with a media exchange network. A legacy MP relies on a PC or a MPS on the media exchange network to act as a proxy for the MP for the purposes of association, authentication, and routing on the media exchange network.

As defined herein, a non-legacy MP is a media exchange network ready peripheral device and includes a digital certificate or any other type of identifying firmware, software, or electronic hardware that may be read by or transferred to a PC, a MPS, or a broadband access headend on a media exchange network. A non-legacy MP may be moved to different locations and still be recognized by the media exchange network when connected to the media exchange network at those different locations through a PC, a MPS, or a broadband access headend.

Other embodiments of the present invention may comprise various combinations and/or multiple instantiations of the elements of FIG. 1, in accordance with various aspects of the present invention.

In general, a legacy device is registered on a media exchange network via a proxy platform such as a PC or a MPS. To register, a serial ID of the device is entered at the request of the proxy platform and the proxy platform sends the serial ID to a server on the media exchange network (e.g., a manufacturer's server). Once the server validates the serial ID, a user of the legacy device gives his name and location and then a user name and password is established. The registration information (i.e., serial ID, user name, password, location, name of the user) may be stored in a media exchange server, a manufacturer's server, or a broadband access headend on the media exchange network.

As part of the registration process, a user may indicate whether he wants to only use the device at his current location of registration or if he wants to enable roaming capability. With roaming capability, a user name and password is entered after entering the serial number of the legacy device at a new location. Such procedures aid in theft prevention of the legacy device.

FIG. 2A is a flowchart illustrating an embodiment of a method 200 to prevent theft of a legacy media peripheral on the media exchange network of FIG. 1, for example, in accordance with various aspects of the present invention. In step 201, a legacy MP is connected to a proxy device (e.g., a PC or a MPS) on a media exchange network at a new location (i.e., the MP is not previously registered at the new location but at another original location). In step 202, the proxy device requests that a device serial ID be entered. In step 203, the proxy device sends the serial ID to a server on the media exchange network and the server checks the serial ID for validity. In step 204, if the serial ID is valid then, in step 205, the proxy device requests that a user ID and password be entered. Otherwise, in step 208, the media exchange network locks out the legacy MP from being used on the media exchange network. In step 206, if a correct user ID and password were entered then, in step 207, the legacy MP becomes registered at the new location. Otherwise, in step 208, the media exchange network locks out the legacy MP.

As an example, referring to FIG. 1, the MP 107 is owned by a user living at the $1^{st}$ home 104 and the MP 107 has previously been registered on the media exchange network 100 at the $1^{st}$ home 104. However, the MP 107 is stolen by a user (a thief) living at the $2^{nd}$ home 108. The thief attempts to use the MP 107 on the media exchange network 100 from the $2^{nd}$ home 108. The thief connects the legacy MP 107 (e.g., a digital camera) to the MPS 106. The MPS 106 requests that a device serial ID be entered. The thief reads the serial ID off of the MP 107 and enters it. The MPS 106 indicates to the thief that the MP 107 has been previously registered at another location and requests that a user name and password be entered. The thief does not know the correct user name and password and enters incorrect information. The MP 107 is locked out of the media exchange network (i.e., the thief cannot use the MP 107 on the media exchange network).

As a modification of the example above, the thief not only steals the MP 107 but has somehow also found out the corresponding user name and device serial ID. When the thief enters the correct information, the media exchange network 100 checks if the MP has been reported as stolen or lost. The user of the $1^{st}$ home has reported to the media exchange server 113 that the MP 107 has been stolen. As a result, the media exchange server 113 on the media exchange network 100 sends a report to the local police indicating the new location of the stolen MP 107. The MP 107 is also locked out of the media exchange network 100.

Other embodiments of the method 200, with certain variations in steps, may be possible as well, in accordance with various aspects of the present invention.

In an embodiment of the present invention, the media exchange server 113 is able to identify the location of the PC 101 and, therefore, the MP 103 by its physical connection to the media exchange network 100. In another embodiment of the present invention, the media exchange server 113 is able to identify the location of the PC 101 and, therefore, the MP 103 by its IP address.

Figure 2B:
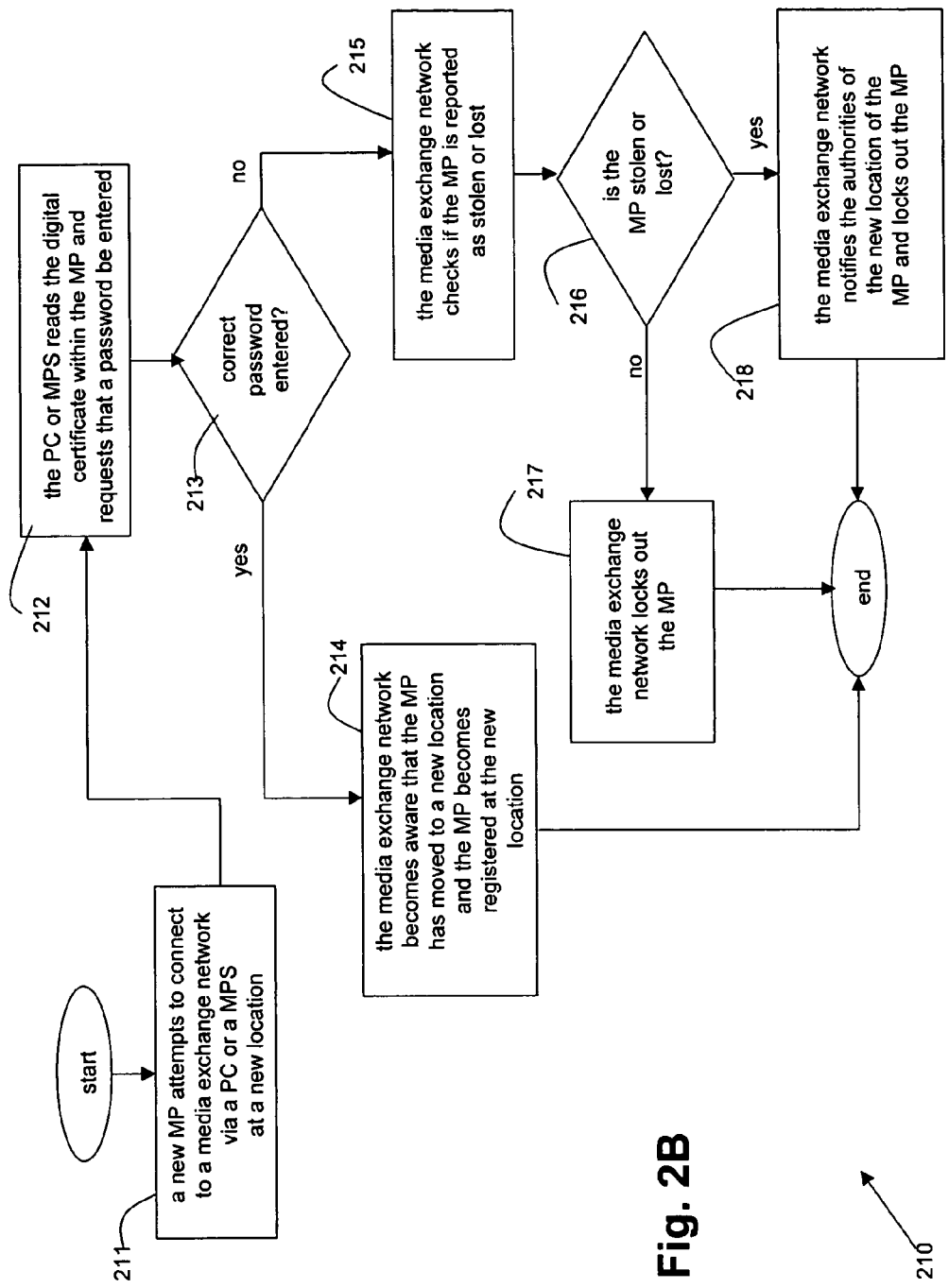
FIG. 2B is a flowchart illustrating an embodiment of a method to prevent theft of a new (non-legacy) media peripheral on the media exchange network of FIG. 1, for example, in accordance with various aspects of the present invention.

FIG. 2B is a flowchart illustrating an embodiment of a method 210 to prevent theft of a new (non-legacy) media peripheral on the media exchange network of FIG. 1, in accordance with various aspects of the present invention. In step 211, a new MP attempts to connect to a media exchange network via a PC or a MPS at a new location. In step 212, the PC or MPS reads a digital certificate within the MP and requests that a password be entered. In step 213, if the correct password is entered, then in step 214, the media exchange network becomes aware that the MP has moved to a new location and the MP becomes registered at the new location. Otherwise, in step 215, the media exchange network, having the information from the digital certificate, checks if the MP has been reported as stolen or lost. In step 216, if the MP has been reported as stolen or lost then, in step 218, the media exchange network notifies the authorities of the new location of the MP and locks out the MP from the media exchange network. Otherwise, in step 217, the MP is simply locked out from the media exchange network.

As an example, referring to FIG. 1, a thief may have stolen the MP 103 (e.g., a digital camcorder) from the $3^{rd}$ home 112. The thief takes the MP 103 to his home (e.g., $1^{st}$ home 104) and attempts to connect the MP 103 to the media exchange network 100 via the PC 101. The PC 101 reads the digital certificate within the MP 103 and requests that a password be entered. The thief, having somehow discovered the correct password, enters the correct password. However, the user at the $3^{rd}$ home 112 has already made the media exchange network 100 aware that the MP 103 has been stolen. The media exchange server 113, having received the digital certificate from the PC 101, checks if the MP 103 has been reported as stolen or lost. Once establishing that the MP 103 has indeed been reported as stolen, the media exchange server 113 reports the new location (i.e., the $1^{st}$ home 104) of the MP 103 to the local authorities. The MP 103 is also locked out of the media exchange network 100.

In accordance with an embodiment of the present invention, a new (non-legacy) MP may include special software that allows a digital certificate in the MP to be read by or transferred to a PC, a MPS, or a broadband access headend on a media exchange network. The digital certificate may be opened with a certificate key by a certificate authority in the media exchange network to authorize the MP. However, in general, a MPS or PC may have a certificate key as well. The certificate authority may be part of a media exchange server on the media exchange network, in accordance with an embodiment of the present invention.

Other embodiments of the method 210, with certain variations in steps, may be possible as well, in accordance with various aspects of the present invention.

In accordance with another embodiment of the present invention, if a MP is lost, a user who finds the MP and tries to connect it to a media exchange network may get a message via his PC or MPS indicating the name and home address of the owner of the lost MP so the user can return the lost MP.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
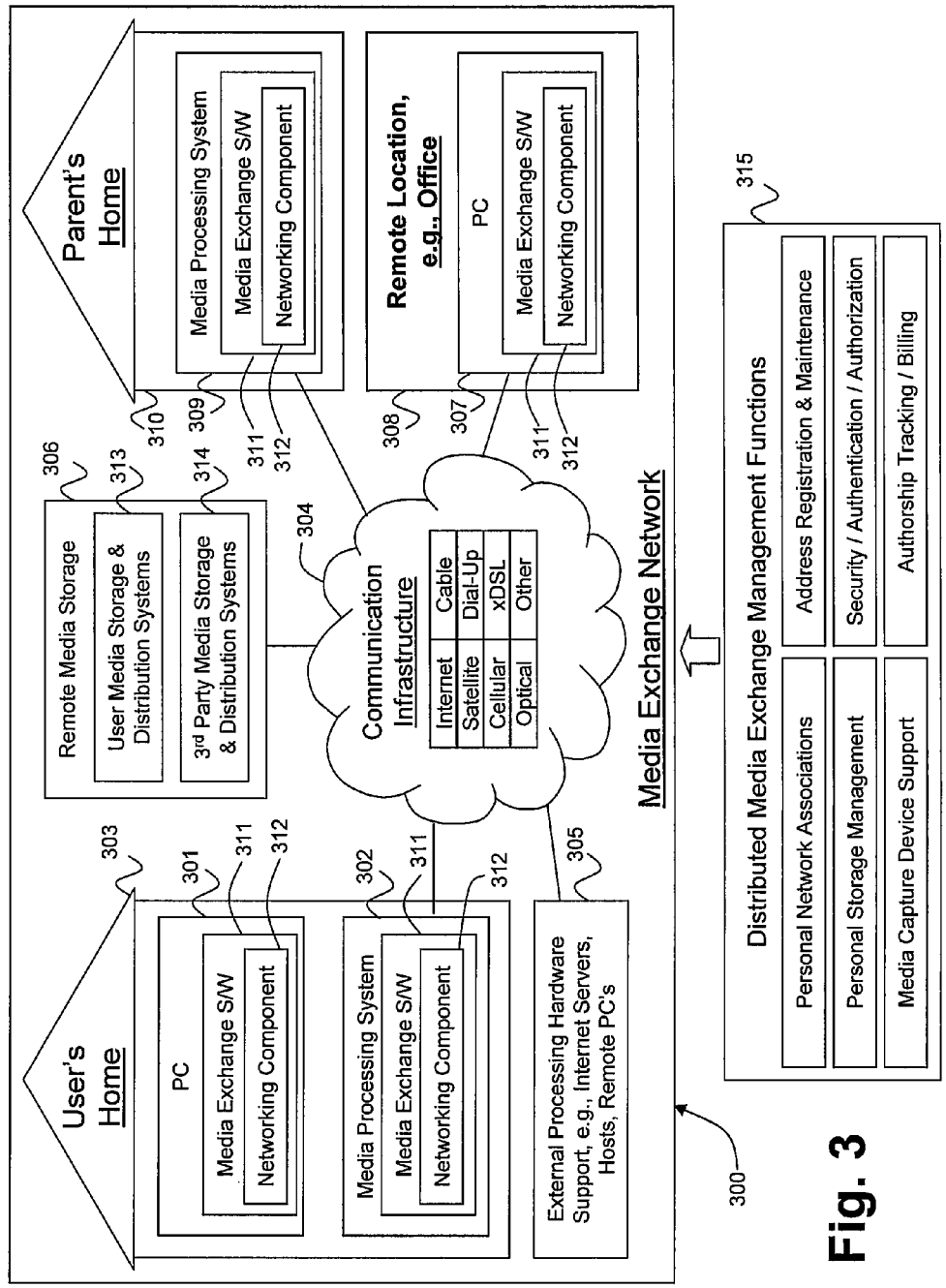
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
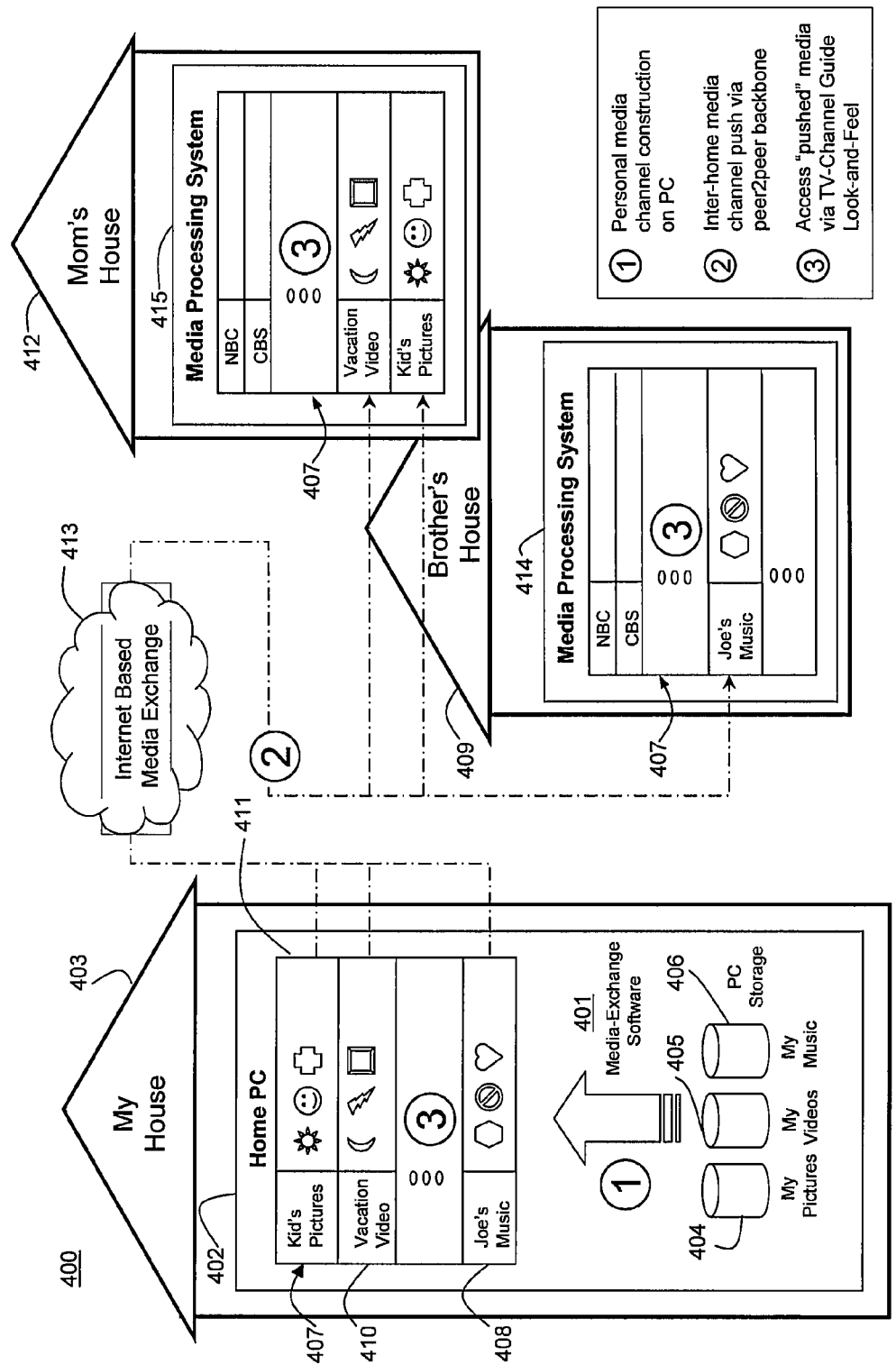
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
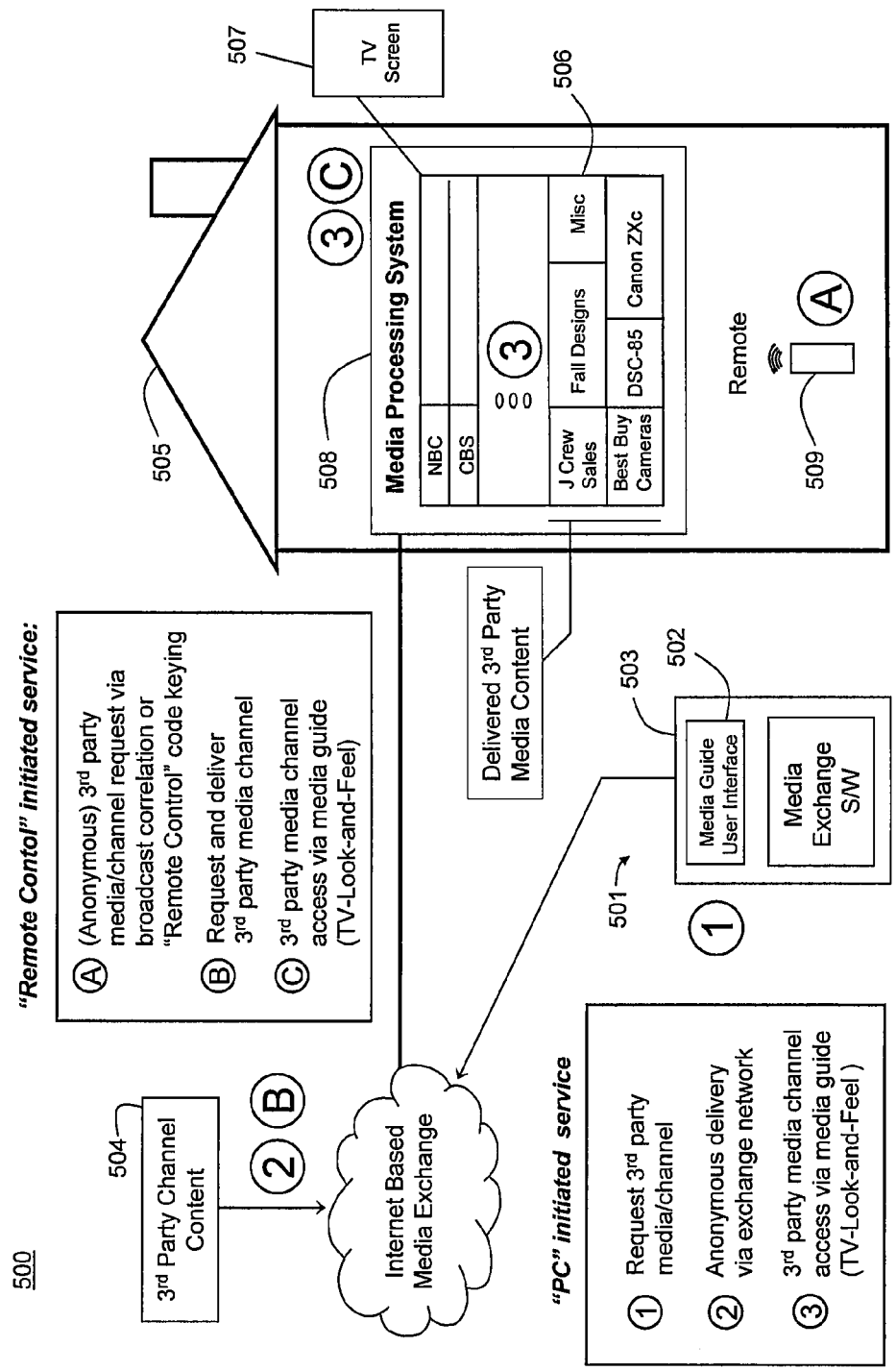
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
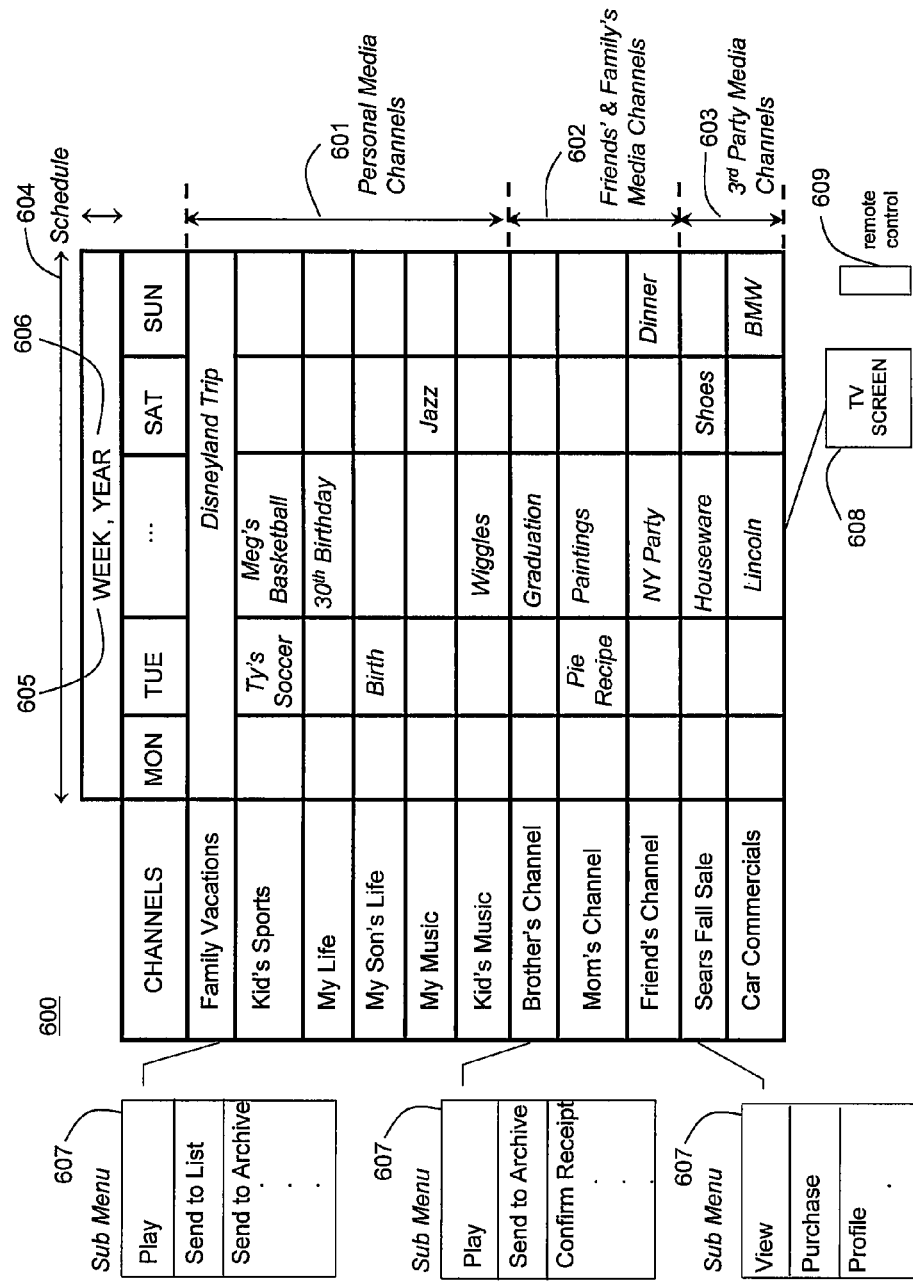
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
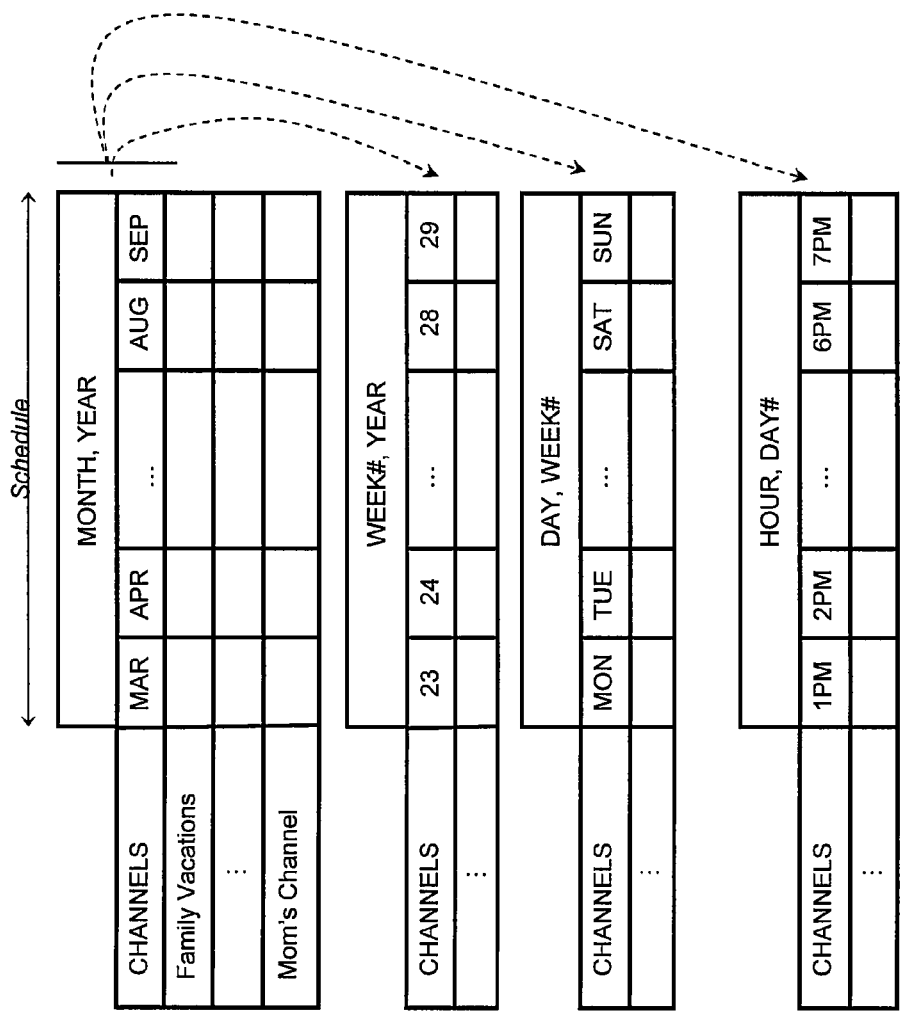
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
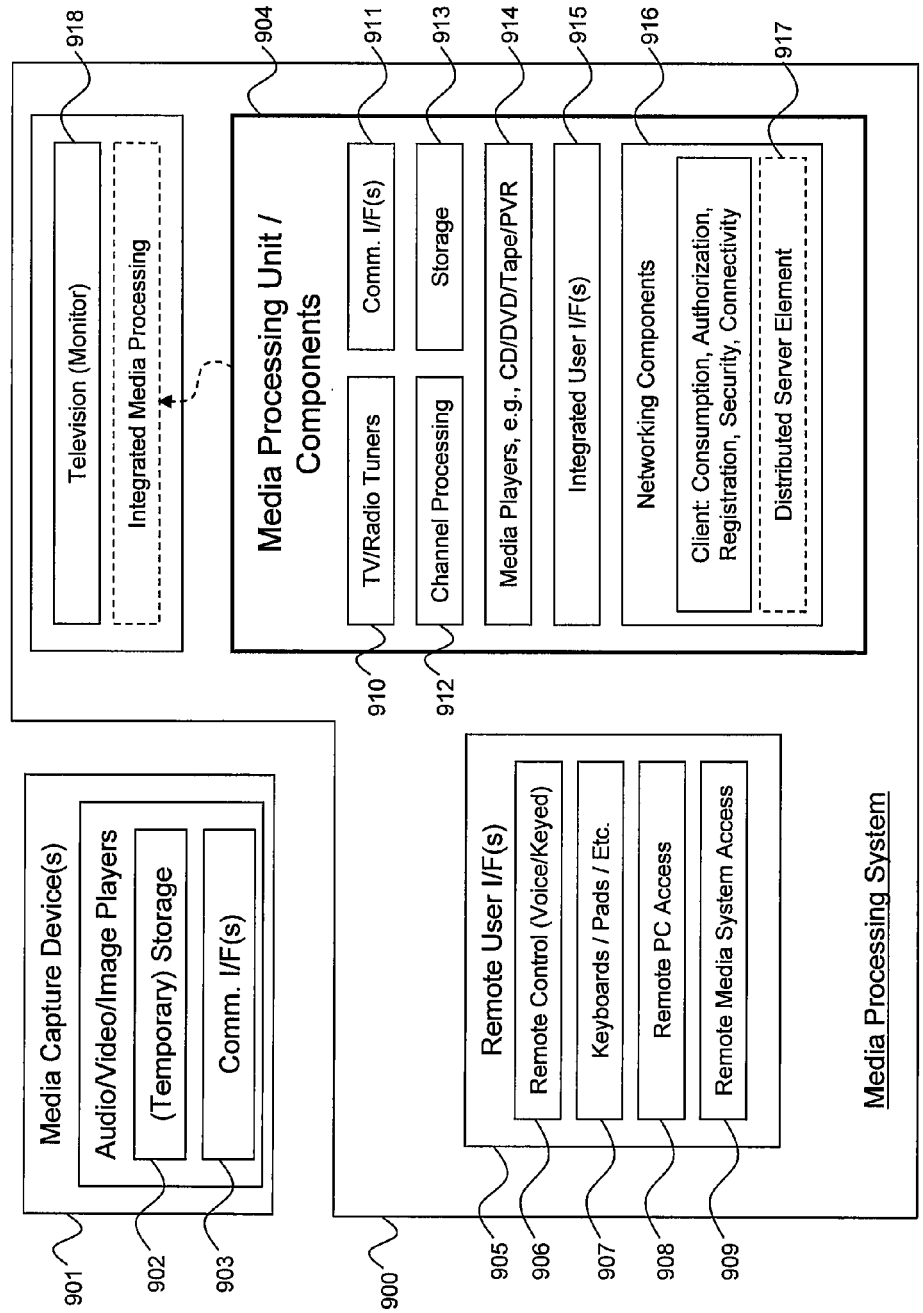
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
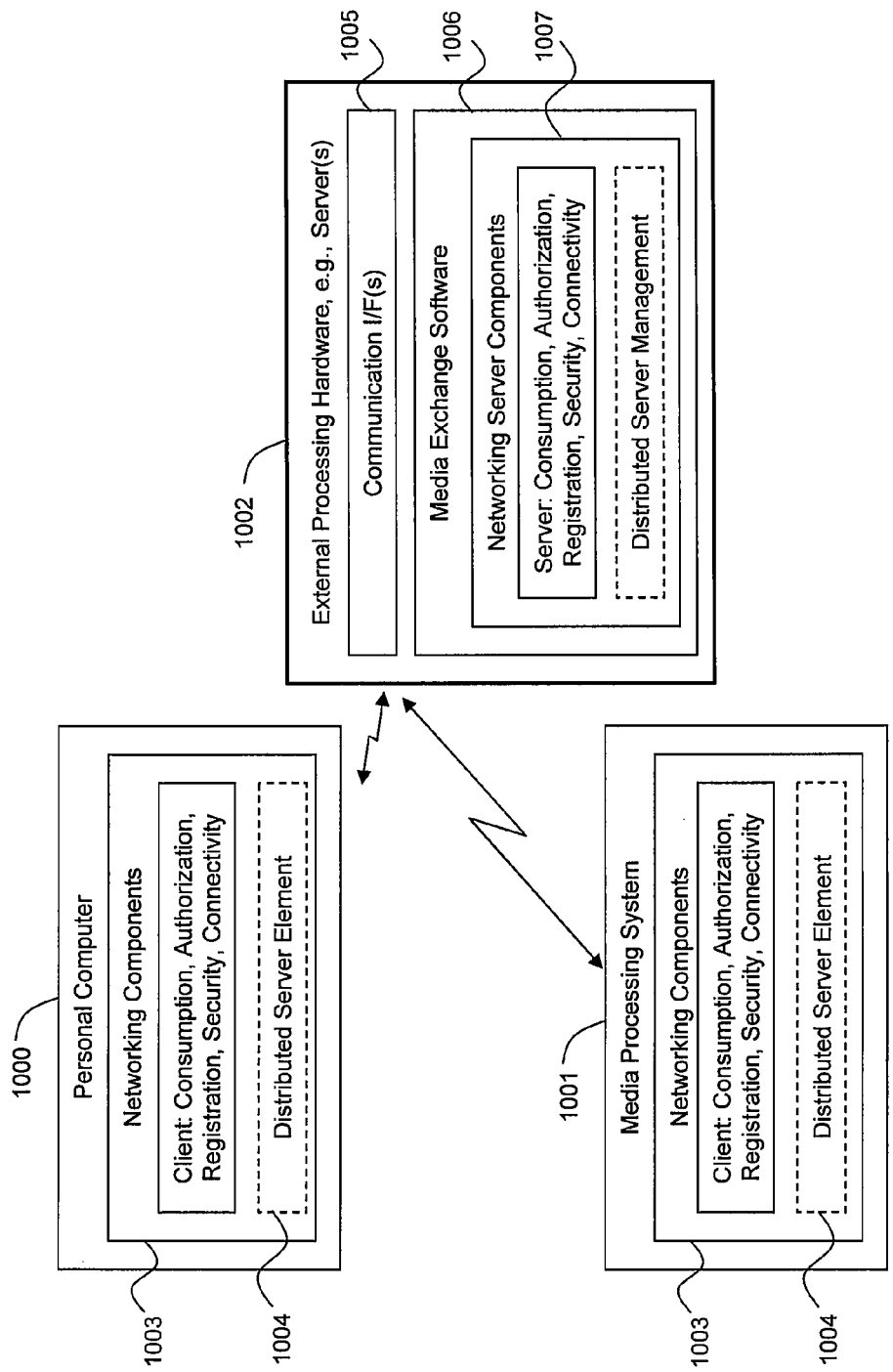
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
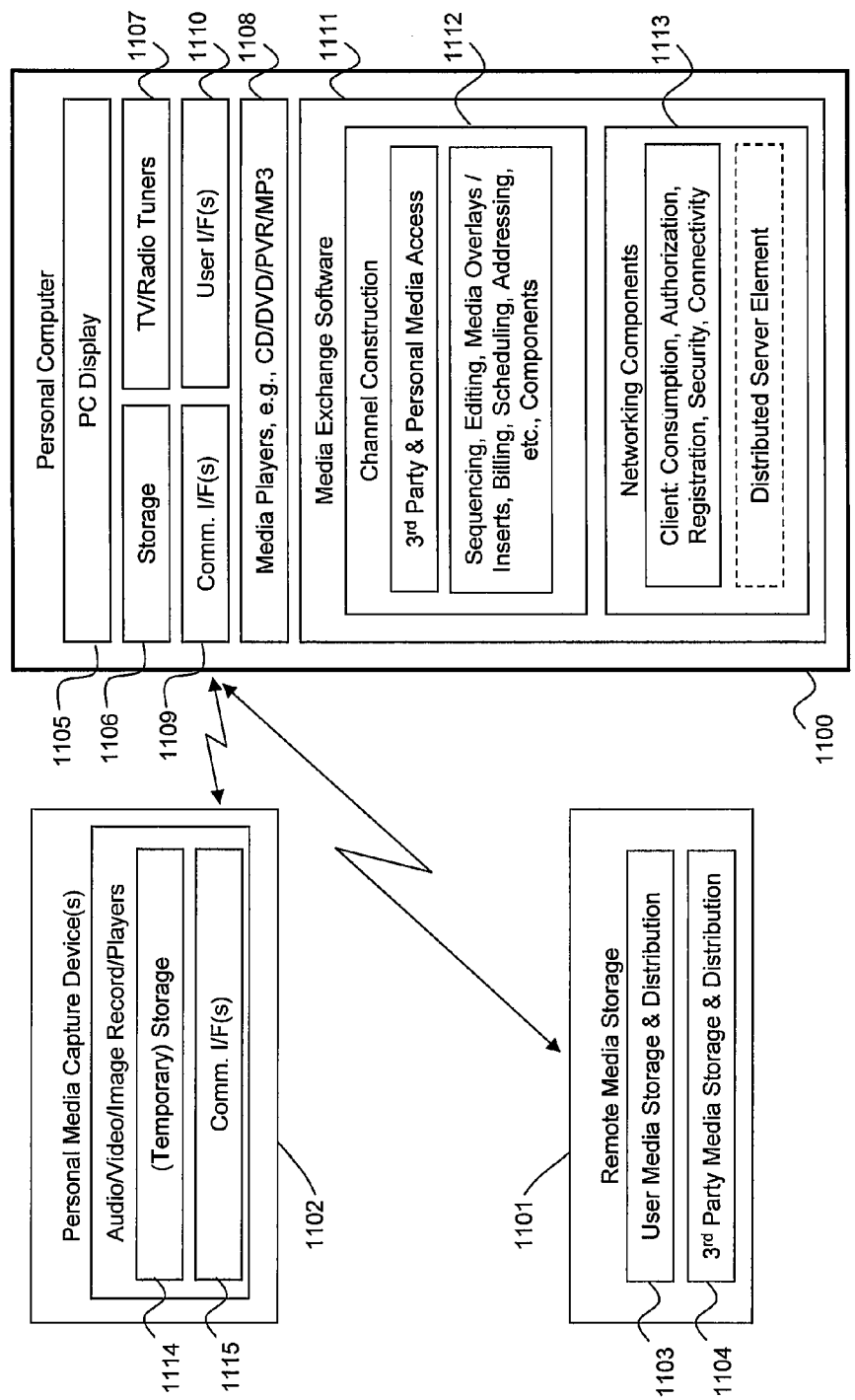
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, a system and method support secure media peripheral association and authentication on a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of registering a media peripheral for use at a location comprising:

registering the media peripheral for use at a designated location by identifying the media peripheral by a unique identifier with a registration device, in which the registration device associates the unique identifier of the media peripheral with the designated location and retains the association of the unique identifier and the designated location;

registering the media peripheral for use at a second location that differs from the designated location by associating an access code with the unique identifier;

validating subsequent access to the media peripheral with the registration device to validate the unique identifier of the media peripheral, in which validation is granted when the media peripheral is at the designated location; and validating subsequent access to the media peripheral with the registration device to validate the unique identifier of the media peripheral when the media peripheral attempts access at the second location, in which validation is granted when the access code is entered at the second location.

2. The method of claim 1, wherein when registering the media peripheral for use at the designated location, the registering device is a server.

3. The method of claim 1, wherein when registering the media peripheral for use at the designated location, the registering device is a media exchange server.

4. The method of claim 1, wherein when registering the media peripheral for use at the designated location, the registering device is a broadband access head end device.

5. The method of claim 1, wherein when registering the media peripheral, a serial identification number of the media peripheral is registered as the unique identifier.

6. The method of claim 1, wherein when registering the media peripheral, a digital certificate associated with the media peripheral is registered as the unique identifier.

7. The method of claim 1, further comprising detecting an attempted validation of the media peripheral at another location different than the designated location and the second location.

8. The method of claim 1, further comprising detecting an attempted validation of the media peripheral at another location different than the designated location and the second location and disabling the media peripheral when the media peripheral is at the another location.

9. A method of registering a media peripheral for use at a plurality of locations comprising:

registering the media peripheral for use at a designated location by identifying the media peripheral by a unique identifier with a registration device, in which the registration device associates the unique identifier of the media peripheral with the designated location and retains the association of the unique identifier and the designated location;

registering the media peripheral for use at locations other than the designated location by associating an access code with the unique identifier;

validating subsequent access to the media peripheral with the registration device to validate the unique identifier of the media peripheral, in which validation is granted when the media peripheral is at the designated location; and validating subsequent access to the media peripheral with the registration device to validate the unique identifier of the media peripheral when the media peripheral attempts access at locations other than the designated location, in which validation is granted when the access code is entered at locations other than at the designated location.

10. The method of claim 9, wherein when registering the media peripheral, the unique identifier, designated location and the access code are registered with a server.

11. The method of claim 9, wherein when registering the media peripheral, the unique identifier, designated location and the access code are registered with a media exchange server.

12. The method of claim 9, wherein when registering the media peripheral, the unique identifier, designated location and the access code are registered with a broadband access head end device.

13. The method of claim 9, wherein when registering the media peripheral, a serial identification number of the media peripheral is registered as the unique identifier.

14. The method of claim 9, wherein when registering the media peripheral, a digital certificate associated with the media peripheral is registered as the unique identifier.

15. The method of claim 9, further comprising detecting an attempted validation of the media peripheral at another location from the designated location and disabling the media peripheral when the media peripheral is at a location other than the designated location and the access code is not provided.

16. The method of claim 9, wherein the access code includes a name and a password.

17. An apparatus to register a media peripheral for use at a plurality of locations comprising:

a processing device to register the media peripheral for use at a designated location by identifying the media peripheral by a unique identifier, in which the processing device associates the unique identifier of the media peripheral with the designated location and in which the processing device registers the media peripheral for use at locations other than the designated location by associating an access code with the unique identifier;

a storage coupled to the processing device to retain the association of the unique identifier, the designated location and the access code; and wherein the processing device validates subsequent access to the media peripheral by the unique identifier of the media peripheral when the media peripheral is at the designated location and validates subsequent access of the media peripheral by the unique identifier of the media peripheral and entering of the access code when the media peripheral attempts access from locations other than the designated location.

18. The apparatus of claim 17, wherein the apparatus is a server.

19. The apparatus of claim 17, wherein the apparatus is a media exchange server.

20. The apparatus of claim 17, wherein the apparatus is a broadband access head end device.

* * * * *